PNEUMATIC TAPE DRIVE SYSTEM

Filed Feb. 24, 1965 3 Sheets-Sheet 1

INVENTOR
GEORGE A. BRETTELL
BY
Robert G. Clay
ATTORNEYS

INVENTOR
GEORGE A. BRETTELL
BY Robert G. Clay
ATTORNEYS

INVENTOR.
GEORGE A. BRETTELL
BY
Robert G. Clay
ATTORNEYS

United States Patent Office 3,329,364

Patented July 4, 1967

3,329,364
PNEUMATIC TAPE DRIVE SYSTEM

George A. Brettell, Woodside, Calif., assignor to Ampex Corporation, Redwood City, Calif., a corporation of California Filed Feb. 24, 1965, Ser. No. 434,770
22 Claims. (Cl. 242—55.12)

This invention relates to tape transport systems, and more particularly to magnetic tape transport systems having pneumatic tape drive elements for providing precise but gentle control of the movement of the tape during bidirectional, continuous or intermittent operation.

Magnetic tape transport systems are merely one example of the many modern systems which require that a web material be advanced in controlled fashion at high rates of speed. High performance magnetic tape signal recording and reproducing systems do however require much more precise control than most other systems, because of the high density or wide bandwidth with which signals are recorded on the tape and the high speeds at which the tape is often moved. Similar precise control is also needed in comparable types of tape recording systems, such as those using electrostatic and thermoplastic recording techniques, but the invention will be discussed only as applied to magnetic tape systems, although it should be understood that the same considerations will be generally applicable for any comparable web transport system.

Currently available tape transport systems employ capstan drive mechanisms that frictionally engage the tape and various servo means to achieve the desired control of tape movements. The tape may be moved at high nominal speeds, such as 75–150 inches per second (ips), but must at the same time be handled gently to avoid tape breakage, stretching or wear of the oxide surface. In addition, the tape must be maintained stably in a precise path as it passes the magnetic recording and reproducing head assembly. Complex problems arise in fulfilling each of these requirements for digital tape transport systems, which are required to operate intermittently and bidirectionally. Digital tape storage systems must start and stop the tape in very brief time intervals and over very short distances in order to meet the demands of associated data processing equipment.

Low inertia tape mechanisms have been employed in previous systems to provide tape loops of variable length interposed in the tape path between the high inertia storage reels and the capstan drive mechanisms. By this means, the tape can be rapidly started and stopped between the buffer mechanisms while the relatively slow action of the higher inertia tape reels is compensated by changes in the loop lengths within the adjacent buffer mechanisms. Accordingly, only the relatively short length, very low weight tape section located between the buffer mechanisms is acted on by the drive mechanism, so that start-stop times of the order of a relatively few milliseconds may easily be achieved.

Most presently available digital tape transports of the data storage type employ constantly counter-rotating capstans having associated pinch roller or other actuating mechanisms for selectively engaging and disengaging the tape in accordance with a desired start-stop sequence. However, the high friction and impulse forces imposed on the tape cause severe problems with tape wear and tape guidance. Pneumatic and vacuum actuators are often employed for tape protection, but all of these dual capstan systems are highly complex and have definite speed and control limitations which are of increasing significance as better performance and increased versatility are demanded. A particularly useful additional feature is an incrementing capability, or the ability to step asynchronously to record data characters in a standard format.

Problems of providing precise tape movement are of course not confined to digital tape transport systems. Whereas control during acceleration and deceleration is critical for digital tape transports, they are permitted relatively wide nominal speed variations (e.g. ±5%). Instrumentation, audio and video recorders, however, are required to maintain far more precise speed control, although start-stop times and distance are not usually significant. With an instrumentation recorder, however, speed variations must often be kept within very close limits, such as ±0.1%. Furthermore, the speed must often be changed over a very wide range, such as 7½ to 120 i.p.s. For the needed speed control, most such systems employ servo-controlled capstan drives operating by comparison of a timing track on the tape to a stable reference. An increase in system performance can only be obtained by increasing the servo capabilities, which usually requires a complete system redesign. Other speed control systems, such as those used for most audio recorders, employ high inertia capstan drives which are inexpensive but of limited performance capability.

Thus the problems involved in precisely controlling tape movement without using complex systems, introducing tape wear, or introducing systems limitations, involve a number of aspects. The extremely high acceleration and deceleration rates, plus an incrementing capability, which are desirable for digital recorders, are incompatible with the close speed control needed for instrumentation and like recorders. It is therefore highly desirable to provide a tape drive or control mechanism having one or all these capabilities.

It is accordingly an object of the present invention to provide an improved drive mechanism for magnetic tape transport systems and like web material transports which does not employ frictional engagement of the tape.

Another object of the present invention is to provide a magnetic tape transport system for data recording and retrieval which achieves bidirectional and intermittent operation with minimium accelerational and decelerational intervals.

A further object of the present invention is to provide an improved magnetic tape transport system which greatly reduces instantaneous tape speed variations.

Yet another object of the present invention is to provide an improved device for correcting instantaneous tape speed variations, such as flutter, in tape transport systems.

Another object of the present invention is to provide a new means for incrementing a tape in small steps at high speed.

Yet a further object of the present invention is to provide a tape drive system wherein the tape movement past the recording and reproducing head is precisely controlled without frictional elements.

Briefly, these and other objects are accomplished in accordance with the invention by providing a tape transport system having at least two differential pressure tape loop columns, one on either side of the magnetic head assembly, with means for varying the pressures oppositely in the two columns in response to a control signal. This pressure change results in a tension differential drawing the tape from one column to the other past the magnetic head assembly, and in a movement of the tape relative to the head assembly. The system may be arranged to provide precise control of speed or acceleration, or both, or to impose a speed correction on tape movement in an existing system, or to increment the tape in small equal steps for recording or reproduction.

In accordance with one aspect of this invention, a servo system is used to provide continuous tape movement at a selected nominal speed. Precise speed control is achieved by monitoring a timing control track on which a fixed frequency reference signal has been prerecorded along with the information signal. The frequency of the reproduced signal is then a direct measure of the actual tape velocity past the head. The reproduced timing reference signal is then fed to a frequency comparator circuit, and compared to a stable reference signal, to generate a signal representative of tape velocity error. The pressure differential in the two vacuum columns is adjusted by the frequency comparator to maintain the desired tape velocity across the head. Loop length sensors are coupled into the reel servos, which are operated to tend to maintain constant loop lengths within each column. The pressure differential system operates in the steady state to compensate for speed variations.

In accordance with another aspect of this invention, the two columns include means for varying tension with loop length, such as a longitudinal groove (or slot) of variable depth. The longitudinal groove is centered within the column midway between the side walls and intersects the tape loop when the loop is in the desired range within the column. The groove provides an air flow by-pass of an amount varying with the loop length, so that the column operates on the loop in a fashion analogous to a spring. Variations of the vacuum level between two vacuum chambers therefore establish a tape tension difference even though the loops are equal in length. This variable tension arrangement also stabilizes the loop positions within the columns during all conditions of operation.

However, pressure changes in the two columns, while extremely rapid, cannot be achieved instantaneously. The time required is a function of the column size and shape, and, in general, a pressure change can be achieved faster with small chambers. But, whereas a small vacuum colum gives quicker acceleration, it will necessarily have less storage capacity.

In accordance with a further aspect of the invention, the pneumatic tape transport system may include both small and large columns on each side of the head assembly. In this arrangement, the small columns are used for quickly accelerating the tape and are located on either side closely adjacent the head assembly. The tape speed control circuitry regulates the vacuum pressures within the two smaller columns in accordance with the command signals and the reproduced timing signals. The larger columns provide the needed low inertia tape storage capacity between each of the associated smaller columns and its tape supply reel. The pressures in the two larger columns are then controlled from loop sensing means in the smaller columns so that the amount of tape in the adjacent smaller column is kept approximately constant. The loop position sensing means in the larger column provides control signals to the reel servo motor so as to maintain the tape loop in the larger column at the predetermined position. In this manner, the system provides extremely rapid acceleration and deceleration without requiring a reel servo of high response capability.

In accordance with yet another aspect of this invention, small columns may be employed on either side of the head assembly in a conventional capstan driven tape transport to correct instantaneous tape speed variations commonly known as flutter. A speed correction signal is derived by monitoring a fixed frequency timing signal prerecorded on a control track adjacent the data tracks or contained within the data itself. The reproduced timing signal is compared to a reference, and the comparison output signal is used to actuate a servo control for varying the vacuum pressures in the two columns. With appropriate phase adjustment, the comparator output generates small instantaneous tape movements, equal in amplitude and opposite in sense to the detected speed variations, to counteract the unwanted flutter.

Also in accordance with an aspect of this invention, for incremental recording, a pneumatic tape transport system may employ small columns on each side of the head assembly, the small columns rapidly accelerating and decelerating the tape during the incrementing interval. Larger columns or a reel servo system may act to rebalance the tape in the small column after each incrementing operation. A tape braking device may be located in the tape path between each of the small column loops and the magnetic head assembly so that as soon as the tape has reached full recording speed and the data has been recorded, the tape may be quickly decelerated and subsequently held in place to prevent any backward movement toward its original position relative to the head assembly. Pneumatic braking devices arranged along the tape path are preferably employed for this purpose, and operated in timed relation to the incrementing movements. With this pneumatic tape drive, incremental or step-by-step data recording can be accomplished with high data densities and high stepping rates heretofore unattainable with other magnetic tape systems.

A better understanding of the invention and its various aspects may be had by reference to the following description, taken in conjunction with the accompanying drawings, in which.

Figure 1:
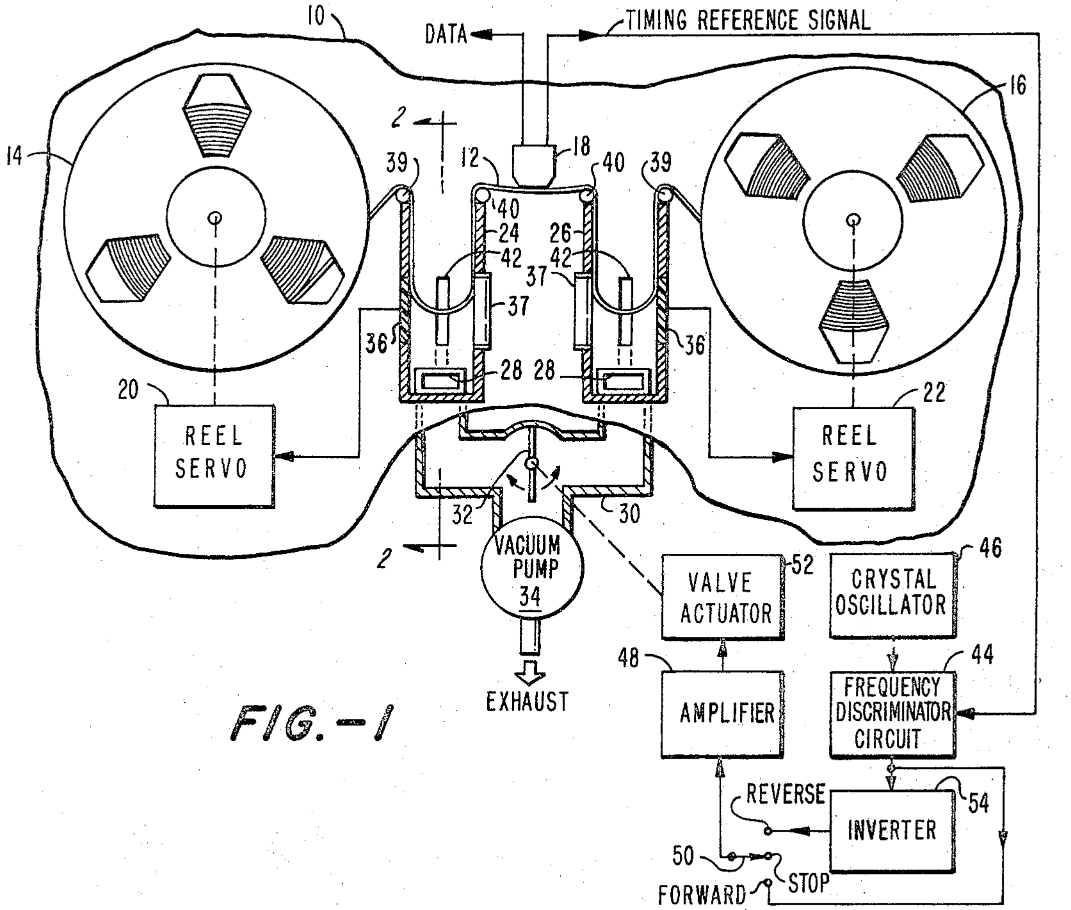
FIGURE 1 is a schematic diagram of one form of pneumatic tape transport system in accordance with the present invention which is shown partially sectioned along the line 1—1 of FIGURE 2, together with a block diagram of the associated control circuit elements.

Referring now to FIGURE 1, the principal elements of a tape transport system in accordance with the invention are shown mounted on a broken away portion of the frontal panel 10 of a tape transport. The tape 12 is moved in either direction along a predetermined path between the tape supply reel 14 and a tape takeup reel 16 past a recording and reproducing magnetic head assembly 18. Separate reel servos 20 and 22, including reel motors (not shown in detail), are coupled directly to the supply and takeup reels 14 and 16, respectively, behind the panel 10. The reel servos are only generally shown in block diagram form physically displaced from the reels for simplicity.

Between the two reels 14 and 16 a pair of differential pressure columns 24 and 26 are symmetrically placed on either side of the magnetic head assembly 18 to form low inertia tape loops. The columns 24 and 26, here vacuum chambers open to atmosphere at their upper ends, each have vacuum inlet port 28 adjacent to their closed ends and coupled through pneumatic tubing 30 and a single controllable butterfly valve mechanism 32 to a vacuum pump 34. Both vacuum columns 24 and 26 also include a loop position sensing device 36 for detecting the length of the tape loop within the column. Any conventional tape loop sensing device, such as photoelectric devices, may suffice for determining the loop position relative to a fixed column, but a particular arrangement providing outputs proportional to the tape position is preferred as described hereinafter. Output signals derived from the associated loop position sensing devices 36 operate the respective reel servos 20 or 22 to control rotation of the supply and takeup reels 14 and 16. The reel servos 20 and 22 may in addition have selectively operable braking means (not shown) for stopping the reels rapidly to insure positive tape control. Various other loop positioning and control arrangements should be understood as being available to those skilled in the art for accomplishing these purposes.

At both the entry and exit ends of the column 24 and 26 (the entry end of the column being herein defined as the side closest to the magnetic head assembly 18), the tape 12 passes over conventional low friction tape guides 39 and 40. Preferably the tape guides 39 and 40 include pneumatic bearings of the type which force a thin film of air between the surfaces of the tape and the guide to effectively eliminate substantial frictional contact. Such pneumatic tape guides are well known in the art and will therefore not be illustrated or discussed in detail herein. It should be noted that with this arrangement the tape is substantially free of frictional restraints in the head assembly region, and therefore is controlled by the tensions introduced by the columns alone.

Figure 3:
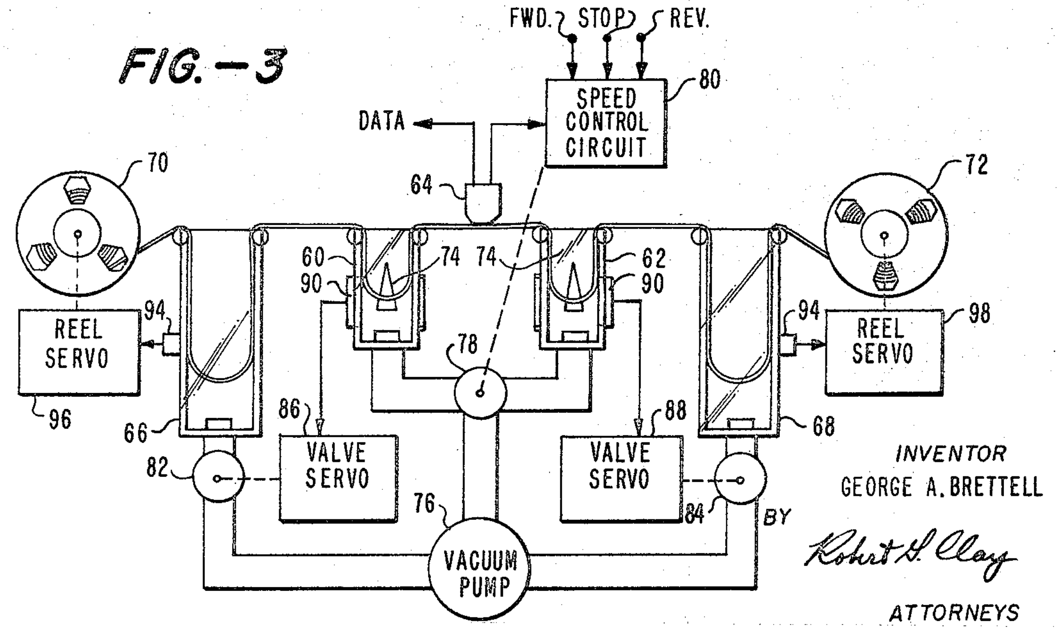
FIGURE 3 is a schematic diagram of another form of a tape transport system in accordance with the invention including a block diagram representation of the associated control circuit elements.
Figures 2, 4, 5:
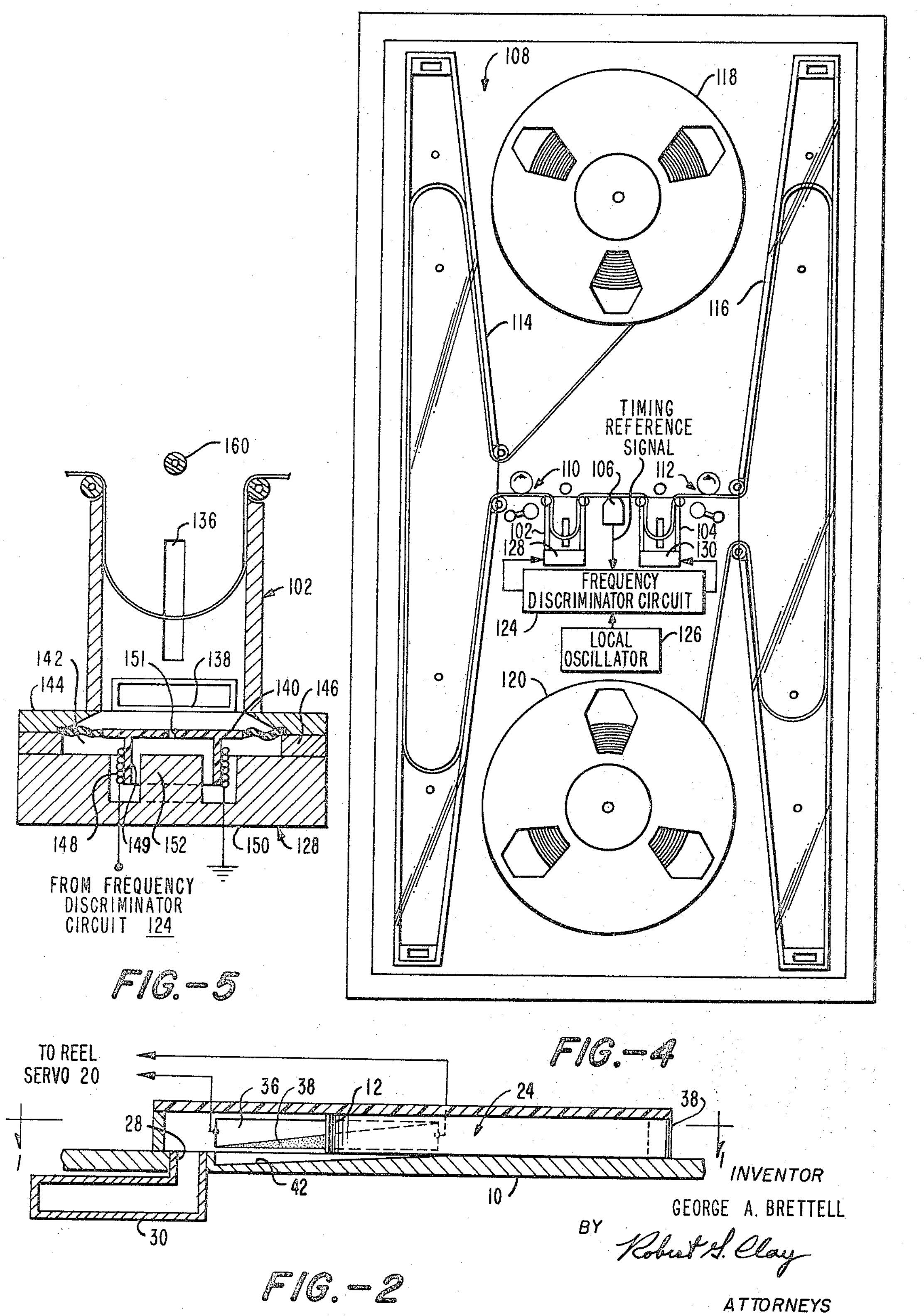
FIGURE 2 is a detailed full sectional view taken along the line 2—2 of FIGURE 1 showing one of the variable pressure vacuum columns.
FIGURE 4 is a simplified schematic diagram of a tape transport having capstan and pinch roller tape drive mechanisms and including a pneumatic tape drive system in accordance with the invention for correcting instantaneous tape speed variations.
FIGURE 5 is a full sectional view of a variable pressure vacuum column for use in the arrangement of FIGURE 4 for producing instantaneous pressure variations in response to an electrical signal.

A portion of the front panel 10 of the tape transport conveniently forms back walls of the vacuum columns 24 and 26. The back wall of each column is provided with a longitudinal groove (or slot) 42 having a transverse cross-section gradually increasing in area along its longitudinal extent from the open end of the vacuum column towards the closed end. Preferably the longitudinal groove 42 is centered on the longitudinal axis of the column midway between parallel side walls and extends an equal distance on either side of the desired loop position. In FIGURES 1 and 2 the grooves are shown as having a variable depth, but alternately may have a constant depth and variable width (as illustrated in FIGURE 3) or any other convenient shape that gives a gradually increasing transverse cross-sectional area. Alternatively, also, the chambers may be varied in width or the orifices coupled to vacuum may be disposed longitudinally in the backwall. The grooves 42 provide a pneumatic by-pass of varying area (dependent upon loop length) between atmosphere and the vacuum source at the closed end. As loop length increases or decreases from a nominal position for a certain vacuum level, the differential pressure across the loop decreases or increases accordingly. Thus the column acts on the loop as a low inertia spring, having a nominal spring force determined by the vacuum level. This arrangement is employed to tend to equalize tape loops during steady state operation, and to avoid tape creep in the static mode. Without this balancing feature, small variations in the tape width or column widths would induce relative movement.

For positive speed control the tape 12 may contain a control track (not shown) having an oscillatory or pulse timing reference signal prerecorded at a fixed repetition rate or frequency for a given tape speed, adjacent the data track or tracks (also not shown). A separate reproducing head (not shown) contained in the magnetic head assembly 18 is positioned to reproduce the timing reference signals during the time that the digital data signals are being recorded or reproduced by the data track heads. Alternatively, with a complex multi-frequency wave, the timing signal may be recorder and filtered out. The reproduced timing reference signals are connected to one input of a frequency discriminator circuit 44 to be compared with a fixed frequency signal from a time stable crystal oscillator 46. The frequency discriminator circuit 44, which may take any of a number of conventional forms, generates an output error signal that is a function of the frequency difference between the timing reference signal reproduced from the tape 12 and the fixed oscillator frequency. This error signal is then coupled through a multiple position switch 50 and an amplifier 48 to control a valve actuator 52, which may take any of a number of conventional forms, and which operates the butterfly valve 32. The switch 50 has FORWARD, REVERSE and STOP positions for controlling the direction and extent of tape movement. The butterfly valve 32 is rotated in the appropriate direction depending on the polarity of the amplified error signal received by the actuator 52. For reverse movement the polarity of the error signal applied with the switch 50 in the REVERSE position is reversed by an inverter circuit 54. The extent of rotation of the butterfly valve 32 determines the differential pressure variations between the two vacuum columns 24 and 26 needed to produce the desired tape movement. The inverter 54 and the amplifier 48 may be conventional, and accordingly will be described only briefly.

The FORWARD, REVERSE or STOP switch positions can be automatially controlled in any conventional manner such as by command signals applied to simple solenoid controls in accordance with the demands of the associated data processing equipment (not shown). The switch 50 may also be a simple electronic gating circuit for selectively passing one of three voltage inputs depending upon the command signal applied. For example, the "stop" command signal would pass a ground potential output, whereas the "forward" and "reverse" command signals would pass error signals equal in magnitude but opposite in polarity. The start-stop transitions for the forward and reverse directions may utilize open or closed loop servo control to bring the tape up to nominal speed or to a stop. In any event, the setting of switch 50 provides a speed and direction reference for the speed control circuitry in which the frequency discriminator circuit 44 thereafter or from the outset provides the error signal for speed control.

The valve actuator 52 holds the butterfly valve 32 at its balanced center position when switch 50 is in the STOP position. With the butterfly valve 32 in its center position, approximately equal vacuum pressures exist in the two vacuum columns 24 and 26. Assuming that the two loops were previously balanced with equal lengths, the tape remains static and the reel servos do not operate. But, for example, when the moveable switch contact is moved to the FORWARD position the butterfly valve 32 is rotated momentarily clockwise through a fixed angle to restrict the passage of air from the column 24 to the inlet side of the vacuum pump 34 and enlarge the passage from the column 26. The vacuum level difference created between the two columns 24 and 26 produces a greater pressure differential across the loop in the column 26 and thus a greater loop tension. The tape is thus accelerated past the magnetic head 18, shortening the loop in the column 24 and lengthening the loop in the column 26. The immediate acceleration of the relatively free-floating length of tape between the columns 24 and 26 occurs at a much higher rate than the reel servos 20 and 22 can accommodate. The initial change in tape speed is thus almost entirely due to the change in loop lengths. Before the full column lengths are used, however, the changes in loop lengths are sensed by the respective loop position sensing devices 36, to actuate the reel servos 20 and 22 thus rotating the reel 14 to supply additional tape to the outlet side of the chamber 24 and rotating the reel 16 to withdraw tape from the outlet side of the column 26 so as to restore the loops to the desired positions. The supply and takeup reels 14 and 16 pick up speed until the tape packs on the reels achieve a peripheral speed momentarily exceeding the desired tape speed, in order to return the loops in the columns toward the desired nominal lengths.

Concurrently, the increased tape speed reduces the speed error signal from the frequency discriminator circuit 44. The valve actuator 52 responds by positioning the butterfly valve 32 to gradually decrease the difference between the vacuum levels at the outlet ends of the columns toward the level needed to maintain the desired tape speed. In steady state operation at a given speed, the pneumatic buffer devices are operated with slightly varying pressure differentials to correct speed errors, the average difference being the amount required to overcome the slight friction in the tape path. The instantaneous difference (and the resultant shift in loop lengths) corresponds to the needed speed correction at that time.
ential created draws the tape from the column 26 to the When the moveable contact of the switch 50 is moved from the STOP to the REVERSE position, the above described operation is reversed. In this case the polarity of the positive error signal from the frequency discriminator circuit 44 is reversed by the inverter circuit 54, and the negative error signal is applied to the valve servo motor 52 to rotate the valve 32 counter clockwise. The differcolumn 24. The reel 14 then begins to rotate to withdraw tape from the outlet side of the column 24, while the reel 16 supplies additional tape to the outlet side of the column 26 in response to the signals produced by the respective loop position sensing devices 36. The speed control circuitry operates in the same manner as previously described to position the butterfly valve 32 to increase and decrease tape speed. At steady speed, the differences in the vacuum levels are, as mentioned above, small.

Accordingly the tape continues to move in a controlled fashion at nominal speed in the desired direction so long as the command signal is applied. But, when the switch contact 50 is moved to the STOP position, the butterfly valve 32 returns to the balanced center position. The pressures at the outlets 28, and the loop lengths, become equal, and the friction of the tape on the heads opposes further tape movement. Eventually the tape is brought to a halt at the head assembly.

The advantages of this system for both accelerative and steady states will now be apparent. On starting or stopping, only the free length of tape between the columns is impulsed, and solely by pneumatically generated forces. Thus there is substantial freedom from wear, and from sudden mechanical impulses which place the tape under constraint. The limiting factor is the speed of movement of the propagating medium air, and the valves, so that extremely high accelerations and decelerations can be achieved with safety. Moreover, the system also provides a constant speed servo control that monitors and adjusts the speed at the head assembly itself. Although the system has been described as a digital tape transport, because of the more critical requirements of such systems as to start-stop characteristics, this speed control permits additional use of the system as an instrumentation recorder. When used for such purposes, an infinite range of speed adjustments is available, and speed control may be enhanced through the use of conventional techniques, such as a higher frequency clock track.

Whereas many conventional tape loop position sensing and reel servo arrangements will suffice certain arrangements are preferred from the standpoint of system stability and power consumption. For some applications, it is sufficient to maintain the loop position within the vacuum columns 24 and 26 at any point between spaced upper and lower limits. The loop position sensors then need only provide on-off indications, and the reel servos are arranged to maintain the loops within the selected range.

However, preferred operation is achieved by use of loop position sensing devices that generate an output signal proportional to the difference between the actual and the desired loop positions, and reel servos capable of responding to the magnitude of the proportional output signal. A preferred form of such a loop position sensing device is illustrated in FIGURES 1 and 2, and includes a light source 37 and a photoelectric sensor 38 disposed longitudinally opposite one another on the two chamber sidewalls. The light source 37, which may for example be a neon tube, is directed through a translucent elongated longitudinal opening in one of the sidewalls towards the opposite sidewall to give a substantially constant illumination density per unit length. The photoelectric sensor 36 on the opposite sidewall includes an elongated longitudinal strip 38 of photoresponsive material, such as one of the well known photoconductors, that lies directly opposite the translucent opening to receive the illumination from the light source 37 to an extent permitted by the position of the opaque tape loop. The photoresponsive strip 38, as shown in FIGURE 2, may be deposited with a triangular shape on a non-conductive substrate forming a rectangular section of the chamber wall. As the tape loop shortens or lengthens in the chamber 24, the total surface area of the triangular strip 38 exposed to illumination by the light source 37, and thus the output signal, changes in proportion to the square of the loop length variation from the desired normal position. This output signal can then be used as a proportional control signal for the associated reel servo 20. It will be understood by those skilled in the art that the shape of the photoresponsive strip 38 may be chosen to give any desired output signal characteristic to correspond to a desired reel servo motor response. Therefore, such proportional loop position sensing devices are preferred for improved system response and tape handling.

It should be understood that the speed with which pressure changes in the column can be achieved with an air flow valve such as the butterfly valve 32 is not instantaneous, but depends upon the time needed to withdraw or introduce the air to the column. The time interval required is primarily a function of the ratio of column volume to airflow rate. Therefore, as a general rule, the use of smaller columns gives quicker tape acceleration, but also reduces low inertia tape storage capacity. Accordingly the column size must be carefully chosen to prevent exceeding the tape storage capacity of the columns during rapid acceleration.

Referring now to FIGURE 3, which illustrates an alternative form of pneumatic tape transport in accordance with the invention, the above-mentioned conflict is resolved to allow extremely rapid tape accelerations without sacrificing low inertia tape storage capacity. For this purpose a pair of relatively smaller vacuum chambers 60 and 62 are located one on either side of the head assembly 64. The size of these vacuum chambers 60 and 62 is limited to slightly greater than the acceleration distance, to produce the desired accelerational response. A second pair of larger vacuum columns 66 and 68 provide moderate acceleration and the needed length of low inertia tape storage capacity between each of the associated smaller columns 60 or 62 and its associated tape supply reel 70 or 72 respectively. Each of the smaller columns 60 and 62 has a longitudinal slot or groove 74 formed in the back wall of the column having a transverse cross-sectional area gradually increasing in size towards the closed end of the column. The slots or grooves 74 are illustrated with a gradually increasing width and have a constant depth. Thus they appear as an elongated isosceles triangle, in FIGURE 3 and are the equivalent of the variable depth grooves 37 of FIGURES 1 and 2.

A single vacuum pump 76 may be used to supply the vacuum pressures for both the smaller columns 60 and 62 and the larger columns 66 and 68. For the smaller columns 60 and 62, the vacuum pump 76 is connected by pneumatic conduits through a butterfly valve 78 to the column outlets. Speed control circuitry is illustrated as a single block 80 receiving reproduced timing reference signals from the head assembly 64 and command signals from the associated data processing equipment (not shown). The speed control circuit 80 may however be of the same type shown in more detailed form in FIGURE 1 consisting of a frequency discriminator, a reference frequency oscillator, a three position switching circuit and a valve servo motor for adjusting the position of the butterfly valve 78. For simplicity the speed control circuit has been illustrated in this and succeeding figures as being controlled by STOP, FORWARD and REVERSE command signals.

At the larger columns 66 and 68 the vacuum pump 76 is coupled through separate throttle valves 82 and 84 to the column outlet ports shown at the bottom of each column. The settings of the throttle valves 82 and 84 are controlled separately by the valve servos 86 and 88 in accordance with signals produced by the loop position sensing devices 90 with the adjacent smaller columns 60 and 62.

In operation, when the STOP command signal is applied to the tape transport system, the tape tension produced in each vacuum column is approximately equal to that produced in the other columns, so that the tape is held stationary relative to the head assembly 64. At such time as the tape is commanded to move in one direction or the other by an appropriate command signal, the pressure differential created between the two smaller columns 60 and 62 begins to move the tape toward the desired nominal speed. Due to the resulting changes in loop positions within the small chambers 60 and 62, the loop position sensing devices 90 on the small columns deliver signals to the respective valve servos 86 and 88 to adjust the settings of the throttle valves 82 and 84. The vacuum pressures within the two larger columns change to withdraw the tape from the larger column on one side and feed it to the smaller column on the same side, while on the other side the tape is drawn into the larger column from the smaller so as to maintain the smaller loops at the desired position within the smaller columns.

The larger columns 66 and 68 also contain tape loop position sensing devices 94, the output signals of which are connected to actuate the reel servos 96 and 98 to rotate their respective tape supply reels 70 and 72 so as to maintain the nominal positions of the larger loops. Thus the low inertia tape loop storage in the larger columns 66 and 68 prevents the smaller loops from exceeding the limited storage capacity of the smaller columns 60 and 62 during acceleration and deceleration.

Referring now to FIGURE 4, there is shown an additional form of pneumatic tape control system in accordance with the invention which may be employed with conventional tape transport systems to correct the instantaneous speed variations commonly known as flutter. A pair of small vacuum chambers 102 and 104 are located one on either side of and adjacent to a magnetic recording and reproducing head assembly 106 of a conventional digital tape transport 108. The conventional tape transport 108 is of a well known type employing constantly counter-rotating capstan and pinch roller assemblies 110 and 112 which are selectively actuated to drive the tape 113 bidirectionally. Double ended tapered vacuum chambers 114 and 116 provide low inertia tape loops between the capstans 110 and 112 and a respective one of the high inertia supply and takeup tape storage reels 118 or 120. The storage reels 118 and 120 are servo operated in accordance with the signals received from tape loop position sensing means of the chambers 114 and 116, respectively. Further details of such conventional portions of this tape transport and its operation will not be discussed hereinafter except where necessary for a complete understanding of the invention.

The recording and reproducing magnetic head assembly 106 contains a separate magnetic head disposed opposite a control track on the tape for deriving a timing reference signal having a frequency indicative of the instantaneous tape speed. The timing reference signal frequency is compared with a standard frequency in a frequency discriminator circuit 124 that generates an error signal at its output indicative of the instantaneous tape speed variations past the head assembly 106. The speed error signal is then applied after proper phase adjustment to operate the vacuum pressure control elements 128 and 130 in opposite senses to produce vacuum pressure differentials between the small columns 102 and 104. Proper phasing is achieved by conventional servo methods for each transport system.

The tape transport 108 is, without modification, subject to the instantaneous speed variations of a conventional digital transport. The presence of the chambers 102 and 104, however, permits correction of flutter characteristics and reduction of speed variations by approximately two orders of magnitude. Note that there is no change in the overall transport configuration, and no effect on normal intermittent operation.

Referring now to FIGURE 5, there is shown the interior detail of one vacuum column 102 and its vacuum pressure control element 128. This arrangement is particularly useful for producing the necessary instantaneous pressure variations in the columns 102 and 104 in response to the electrical signal outputs from the frequency comparator circuit 124. The small chambers 102 and 104 each contain a centrally disposed longitudinal slot or groove 136 with variable cross-sectional area for stabilizing the position of the tape loops in the two chambers, and a vacuum outlet port 138 is located at the closed end of each chamber. This end of the chamber 102 is closed off by a moveable diaphragm having a central rigid portion 140 supported by a surrounding flexible material 142, which is clamped at its edges between upper and lower supporting members 144 and 146, respectively. A loudspeaker type coil 148 is wound about rectangular coil support 149 which is attached to the face of the central rigid portion 140 opposite the chamber interior. A base structure 150 composed of magnetic material has a central portion 152 extending into the hollow central portion of the coil supporting member 149 and is attached at its edges to the adjacent diaphragm supporting member 146. The speed error signal applied from the frequency comparator circuit 124 to one end of the coil 148, the other end of which is grounded, moves the diaphragm 140 upward or downward to expand or contract the column volume at the closed end. This arrangement is very similar to a conventional loudspeaker unit attached to the bottom of the vacuum column 102 and produces instantaneous vacuum pressure variations by quickly decreasing and increasing the chamber volume. A small hole 151 may be provided in the diaphragm to allow pressure to equalize slowly on both sides thus preventing net forces from acting on the piston during steady state operation.

The vacuum column 104 disposed on the other side of the head assembly 106 is constructed in the same manner except that the speed error signal from the frequency comparator circuit 124 is connected to have an opposite effect on the vacuum pressure column. It will be recognized by those skilled in the art that this may be accomplished in any of a number of different ways, for example, by reversing the polarity of the speed error signal provided to one of the columns or by winding the speaker coils in opposite directions.

Where smaller columns are used in conjunction with larger columns, as in the arrangement of FIGURE 4, the vacuum level must be substantially stronger in the smaller chamber. In some instances, unless the maximum obtainable pressure differential across the smaller loops is extremely high, the sudden forced acceleration of the tape will completely withdraw the loops from the smaller columns 102 and 104. This situation is not serious as long as the tape loop can be reformed after nominal speed has been reached. Reforming of the loops may be insured by any of a number of conventional arrangements for this purpose, one of which simply consists of adding a single post or roller 160 located at the open end of the smaller columns 102 and 104 centered between the inlet and outlet guides. By this means, the tape is physically stopped from being completely withdrawn and remains in a position across the open end of the column where the tape can again be pulled back into the column by the vacuum pressure. Such a post or roller is however unnecessary if the tape path and open end of the chamber is such that the tape is stretched across the open end of the columns 102 and 104 during acceleration in a manner to retain sufficient pressure differential for recapture of the loop.

Correction of instantaneous tape speed variations by addition of this relatively simple pneumatic system permits far more precise speed control of the less complex tape drive systems. Accordingly, the less expensive tape transport arrangements heretofore considered suitably only for less precise speed requirements in digital data recording can be adapted with only slight modification to function as instrumentation, video and audio recorders having nominal speed variations of 0.1% and less.

Figures 6, 8, 9:
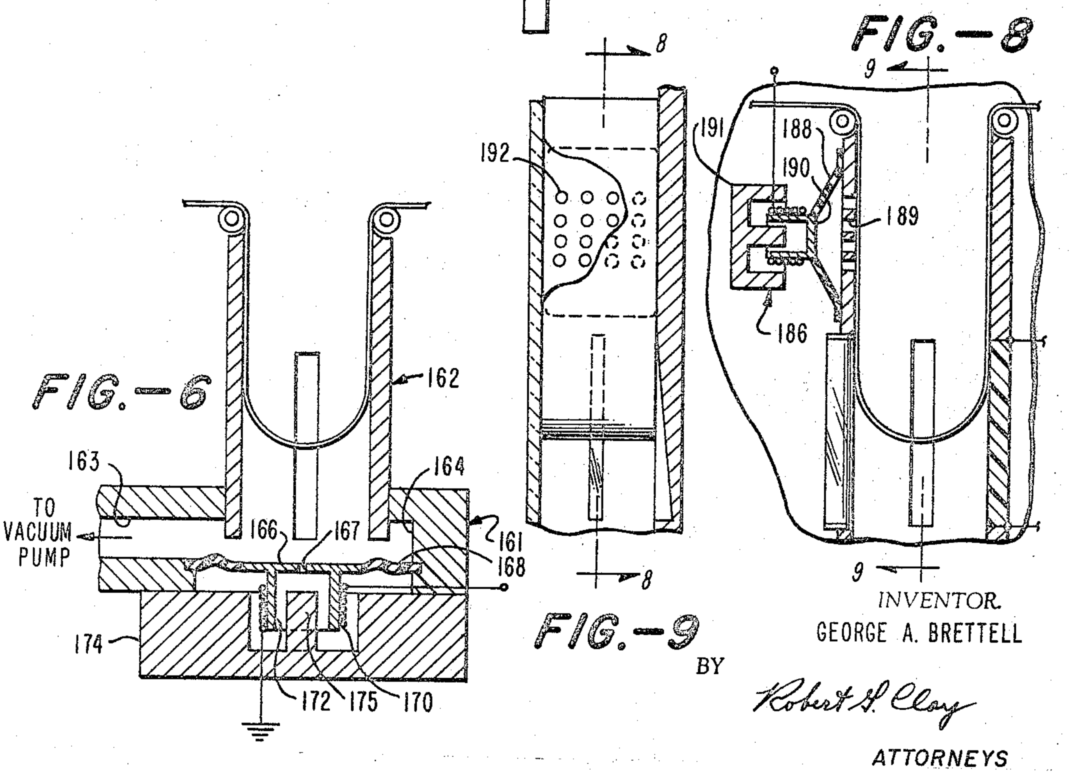
FIGURE 6 is a full sectional view of another form of a variable pressure vacuum column for use with tape transport systems in accordance with the invention.
FIGURE 8 is a detailed fully sectioned side view taken along the line 8—8 of FIGURE 9 of a portion of one of the variable pressure vacuum columns adjacent either side of the magnetic head assembly as shown in FIGURE 7.
FIGURE 9 is a detailed full sectional view of the same portion of the vacuum column taken along the line 9—9 of FIGURE 8.

Referring now to FIGURE 6, another form of variable pressure vacuum chamber is shown utilizing a device equivalent to the loudspeaker unit shown in FIGURE 5 for achieving both the momentary pressure changes in the column needed for quick acceleration and the constant pressure changes needed for driving the tape in continuous fashion at a fixed speed in the manner previously described in connection with FIGURES 1, 2 and 3. Vacuum chambers constructed in accordance with this aspect of the invention may be used in place of the vacuum chamber and valve arrangements described in FIGURES 1, 2 and 3 to improve operation of an existing tape transport system.

A pressure regulation device 161 in accordance with this aspect of the invention is coupled to the closed end of a conventional vacuum chamber 162 having substantially parallel side walls. The pressure regulation device 161 has a hollowed center portion 164 with an outlet 163 coupled by appropriate pneumatic conduits to a constant flow vacuum pump (not shown). A movable diaphragm consisting of a rigid central portion 166 having a small hole 167 and connected by a flexible portion 168 to the interior walls of the hollow opening 164 is disposed adjacent the closed end of the chamber 162. An actuating coil 170 is wrapped about a rigid coil support 172 which is attached to move with the rigid central portion 166 of the diaphragm. A base section 174 is fabricated of a magnetic material and is formed with a central protrusion 175 which acts as a stationary solenoid core for the magnetic coil 170. Thus when electrical current flows in the coil 170, the magnetic field acting on the core 175 flexes the diaphragm in one direction or the other.

The parallel side walls of the chamber 162 may extend slightly into the hollowed center 164 toward the rigid center portion 166 of the diaphragm. The distance between these protruding end sections of the side walls and the diaphragm defines an air passage from the closed end of the vacuum chamber 162 to the outlet 163. When the solenoid coil 170 is actuated to move the diaphragm away from the central protrusion 175, the size of this air passage is increased to permit a greater air flow and thus create a greater vacuum at the lower end of the chamber 162. On the other hand, when the diaphragm is moved in the other direction, the opening becomes more restricted to reduce the air flow thus increasing the pressure and lowering the vacuum at the closed end of the chamber 162. In addition, sudden movement of the diaphragm also causes the volume at the closed end of the vacuum chamber 162 to be suddenly changed. A sudden volume variation quickly changes the concentration of air per cubic measure thus altering the pressure. The change in pressure due to the cudden volume variation is additive with respect to the pressure change caused by the air flow variation, but it lasts only momentarily. The greater pressure change during the initial period of acceleration and deceleration gives quick tape starts and stops, while the regulation of the air flow thereafter permits the somewhat lower constant pressures to be maintained and controlled for continuous tape movement in one direction or the other, as previously described in connection with FIGURES 1, 2 and 3.

Whether the pressure regulation device in each of these examples consists of a valve or a loudspeaker diaphragm unit, the mechanical displacement should be a substantially linear function of the electrical signal independent of frequency, history, ambient conditions, or tape loop position except where deliberately employed for damping. With the loudspeaker diaphragms, an undesirable position bias may exist unless pressure on both sides is equalized by slow leakage through a small hole in the diaphragm.

Tape acceleration rates obtainable with these pneumatic systems greatly exceed those obtainable with previous high performance mechanical tape drive systems. These increased acceleration capabilities are most desirable in digital data storage systems where the total time interval involved in starting or stopping the tape is relatively long compared to the high data transfer speed of modern computer equipment. Also the distances traveled by the tape during these start and stop intervals are most important because gaps must be provided between successive records on the tape so that no data will be transferred until nominal recording velocity has been reached. Obviously then the total amount of data recordable on a given length of tape can be increased by reducing these interrecord gap lengths without changing the bit per inch density within the records.

Furthermore start and stop times and distances are of even greater importance for incremental or step-by-step magnetic tape recording and reproducing since it is necessary to accelerate and decelerate the tape between each successive data bit. The magnetic tape should preferably be at nominal recording speed before magnetic recording or reproducing can take place, although recording can be accomplished with the tape stationary. In order to operate compatibly with standard computer tape formats, the recording and reproduction must be at bit densities of 200, 556 or 800 bits per inch. For these reasons, punched card or paper tape mechanisms have heretofore been preferred for incremental recording and paper-to-magnetic tape converters have then been used to generate magnetic tape records with acceptable data bit densities.

Now however, with the rapid tape acceleration possible with pneumatic tape drive systems in accordance with this invention, incremental or step-by-tep data recording and reproducing high data bit densities becomes feasible. Such high density incremental recorders utilize the basic features of the examples previously described herein.

Figure 7:
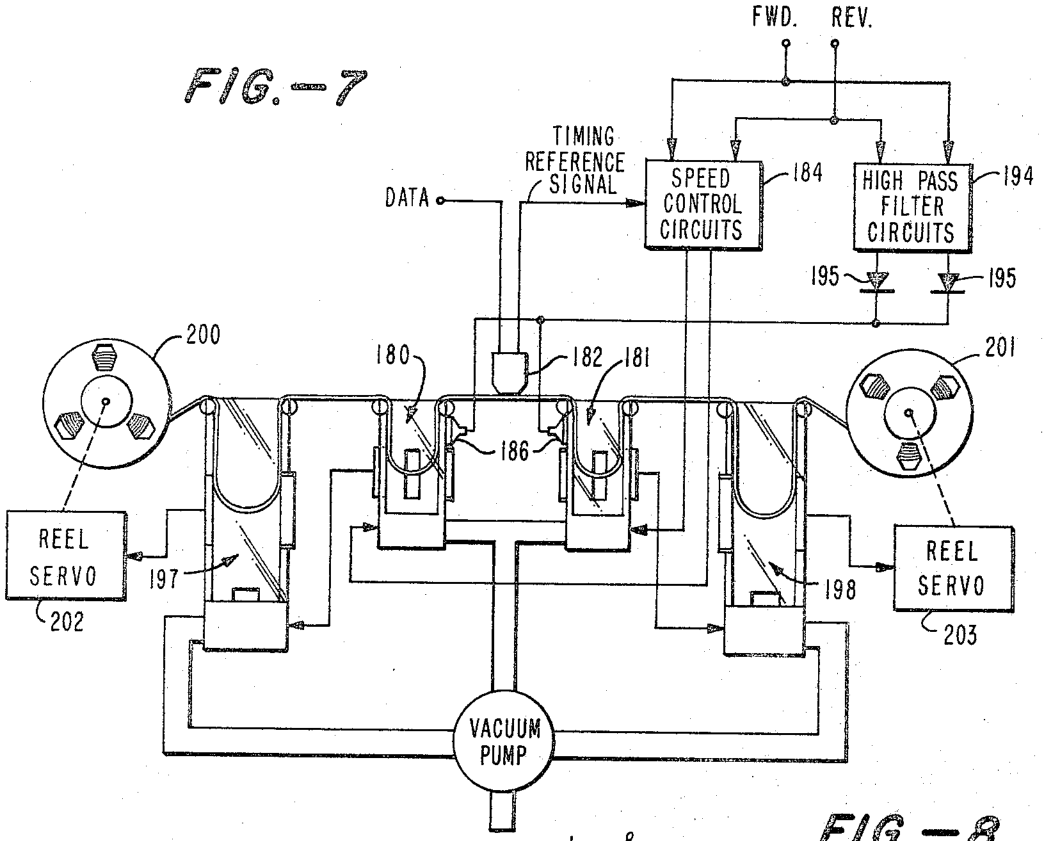
FIGURE 7 is a schematic diagram illustrating a pneumatic tape drive system in accordance with the invention for high density incremental or step-by-step data recording on magnetic tapes.

Referring now to FIGURE 7, there is shown a pneumatic tape drive system in accordance with the invention that can operate bidirectionally for incrementally recording and reproducing data at high bit densities, and in addition can be made to move the tape continuously in either direction for continuous recording or reproducing or for finding selected positions on the tape. It will be appreciated that the incrementing function may be provided alone, if desired, merely by eliminating certain parts of the equipment.

A pair of variable pressure vacuum chambers 180 and 181 are located one on either side of the recording and reproducing head assembly 182 to move the tape in small incremental steps. The particular pressure regulation devices employed at the closed ends of the chambers 180 and 181 are chosen in accordance with whether continuous operation is desired in conjunction with the incrementing function. For incremental operation alone, the simple diaphragm arrangement described in FIGURE 5 may be employed, whereas for both functions the pressure regulation device of the type illustrated in FIGURE 6 is preferred for quick response and for maintaining the smaller substantially constant pressure differentials for continuous tape movement. The details of these particular pressure regulation devices have already been described in connection with previous embodiments and therefore will not again be discussed in this portion.

The pressure regulating devices for the chambers 180 and 181 receive control signals generated by the speed control circuits 184 in accordance with the forward and reverse command signal applied from the associated data processing equipment (not shown). During continuous operation, reproduced timing reference signals are compared with a fixed frequency in the manner previously described to generate speed error signals for fine tape speed adjustments. For each incrementing movement the forward or reverse command signal takes the form of short duration voltage pulses having a duration equal to the short accelerational interval needed for the tape to reach nominal speed, and a shape, rectangular or otherwise, suitable for producing the desired acceleration in view of the electro-mechanical response characteristics of the actuating valve or piston. If only incremental operation is desired, the speed control circuits 184 may be simplified so that only power amplifiers are needed to produce current pulses of equal duration for actuating the solenoid coils.

Each of the two smaller vacuum chambers 180 and 181 has a pneumatic brake 186 attached to the sidewall adjacent the magnetic head assembly 182. As may best be seen in FIGURES 8 and 9, this pneumatic brake consists of a signal operated loudspeaker device having a diaphragm 188 enclosing a small volume adjacent the outer surface of the sidewall nearest the head assembly 182. The edges of the diaphragm 188 are sealed to the outer sidewall surface to surround a section perforated with small holes 189. Except for a small rigid central portion formed as an integral portion of a hollow coil supporting structure 190, the diaphragm material is flexible. A stationary base member 191 has a central portion forming a magnetic core extending into the hollow opening of the core support member 190. When an electrical current flows through the coil as a result of an applied braking signal, the rigid central portion 190 of the diaphragm rapidly moves outward away from the perforated sidewall. The small enclosed volume rapidly expands to lower the pressure suddenly within the diaphragm. The vacuum created is communicated through the perforating holes 189 in the sidewall to the adjacent tape to draw it forceably against the inner surface of the sidewall. The frictional contact between the tape and the sidewall surfaces is thus greatly increased, and a sudden braking effect on the tape results at that point in the tape path.

The braking signal for operating the pneumatic brakes 186 may be derived from the trailing edge of the forward or reverse command signals by means of high pass filter circuits 194 and unidirectional current devices or diodes 195. The high pass filter circuits 194 differentiate the command signals to produce spikes of one polarity at the leading edges and spikes of the opposite polarity at the trailing edges. The unidirectional devices 195 then select the pulses of the proper polarity representing the trailing edge of the command signal. Alternatively, where a three position operating switch is used as shown in FIGURE 1, another moveable contact can be ganged therewith to apply a braking signal when the operating switch is moved to its STOP position. A pair of outer vacuum chambers 197 and 198 form additional tape loops between each of the smaller chambers 180 and 181 and its associated tape storage reels 200 and 201. When only incremental operation is desired the two outer chambers 197 and 198 need not be of the variable pressure type nor need they have a larger tape storage capacity than the inner chambers 180 and 181. Instead these outer chambers 197 and 198 may have constant vacuum pressure and small storage capacity only sufficient to handle a quick succession of incrementing operations. However, for continuous operation also, the outer chambers 197 and 198 must have pressure regulation devices of the type shown in FIGURE 6 which operate in response to the loop position sensing devices of the inner chambers 180 and 181 as previously described in connection with the system shown in FIGURE 3. Of course in both modes of operation the supply and take-up tape storage reels 200 and 201 are rotated by reel servo motors 202 and 203, respectively, in response to signals from loop position sensing devices on the two outer chambers 197 and 198.

The incrementing operation can best be understood by considering an actual sequence of events such as occur upon receipt of a forward command signal for a forward incremental movement. Assume that this forward command signal is a rectangular shaped voltage pulse of negative polarity having a duration of one millisecond and that at the end of this one millisecond pulse interval the tape has reached nominal recording velocity of approximately 100 inches per second. These figures are representative of results actually obtained with a practical exemplification in accordance with the invention. At the end of the one millisecond command pulse interval, the tape may have traveled a distance slightly less than 0.001 of an inch. The diaphragms in the pressure regulation devices then begin to return to their normal position due to the spring action of the flexible portion. When the vacuum pressures in the closed ends of the chambers 180 and 181 return to their original levels, further movement of the tape in the forward direction is stopped since the accelerating tension differential no longer exists. Normally this tends to move the tape back in the opposite direction. If permitted the tape would return to its original position relative to the head assembly 182 so that little, if any, net forward motion would be achieved by the incrementing operation. However, with the provision of the pneumatic brakes 186, the net forward movement is retained after the command pulse has ceased.

Note that the negative going spike produced by the sharp leading edge of a negative going command signal at the output of the high pass filter circuits 194 is blocked by the diodes 195, but the positive going pulse produced in response to the sharp trailing edge would pass the diode 195 to actuate the pneumatic brakes 186 just after the data pulse has been recorded. In this way the braking action restrains further forward movement of the tape and prevents subsequent reverse movement due to the reequalization of the vacuum pressures in the two chambers 180 and 181. In other words, the two chambers 180 and 181 are decoupled from one another during pressure rebalancing by actuation of the braking mechanisms 186. Before this pressure rebalancing begins the loop in the chamber 181, towards which the tape had been moving in the forward direction, is slightly longer than that in chamber 180 due to the incremental movement and the vacuum pressure at the closed end of the chamber 181 is momentarily slightly higher than that in the chamber 180. Before the pneumatic brake mechanisms 186 are released, however, a small increment of tape is withdrawn from the constant pressure chamber 197 to restore the loop position in the smaller chamber 180, while at the same time the constant pressure chamber 198 withdraws an equal tape increment from the smaller chamber 181 to restore that tape loop to its original position and thus equalize the vacuum pressures before the brakes 186 are released. In other words, during the incrementing operation, the constant tension outer chambers 197 and 198 tend to equalize conditions in the inner chambers 180 and 181. The reel servo mechanisms 202 and 203 need operate only after a series of incrementing movements in the same direction has lengthened or shortened the loops in the outer columns 197 and 198 by a considerable amount.

For continuous operation in either direction, the forward or reverse command signals may also be rectangularly shaped and are maintained at a negative level for the entire movement interval. At the end of the movement interval, the negative going trailing edge of the command signal actuates a pneumatic braking mechanism 186 as previously described to quickly stop the tape and prevent any backward movement, even though such backward movement would be but a small percentage of the total tape distance traveled. The remainder of the system may operate as described in connection with the example of FIGURE 3 to produce continuous tape movement at controlled speeds.

Using the previous example assumed as representative of an actual incrementing operation, it may be seen that incrementing systems in accordance with this invention are able to record or reproduce data bits one bit at a time on a magnetic tape with a bit density of 1000 bits per inch, even though nominal recording or reproducing speed is as high as 100 inches per second. Data bit densities of 10,000 bits per inch at the same high recording speeds are obtainable. Those skilled in the art will recognize that this represents a sigificant improvement in the field of magnetic tape incremental recording. The data bit densities, data recording and readout speeds obtainable with incremental systems in accordance with this invention actually exceed those of high performance punched card or paper tape systems heretofore used.

It would be understood that various changes in the details of these systems, which have been herein described and illustrated in order to explain the nature of the invention, may be made by those skilled in the art within the principle and scope of the invention as expressed in the appended claims.

What is claimed is:

1. A capstanless drive system for driving an elongated web material in a controlled fashion across an intermediate device disposed between two storage reels, comprising at least a pair of pneumatic buffer means for forming low inertia loops in the web material on opposite sides of the intermediate device, servo means responsive to command signals for varying the tension introduced by each of the buffer means, means responsive to the loop lengths in the buffer means for operating the storage reels to tend to maintain nominal loop lengths therein, and means responsive to the speed of movement of the web material for operating the servo means to maintain a constant linear tape speed.

2. A drive system for continuously moving an elongated web material in a controlled fashion between storage reels past an intermediate device in opertaive relationship with the web material comprising a pair of pneumatic buffer means, servo means responsive to the loop length in the pneumatic buffer means for actuating the adjacent storage reel to tend to maintain a predetermined loop length in each of the pneumatic buffer means, and control means coupled to said buffer means and responding to externally generated command signals for producing tension variations of opposite senses between the two buffer means to move the tape in a desired direction, and wherein the tape path between the storage reels is characterized by low friction.

3. The drive system of claim 2 wherein the tension differential produced by the control means in response to a command signal is variable in response to a speed error signal, and wherein the control means further includes means for sensing the actual speed of the web material as it passes the intermediate device, and speed comparison means for producing a speed error signal indicative of the difference between the actual speed and a desired speed of the web material.

4. A drive system for advancing an elongated web material in a controlled fashion past an intermediate operative device comprising a pair of web material storage means located one on either side of the intermediate operating device, pneumatic means forming a pair of low inertia web material loops of variable length at a pair of regions adjacent opposite sides of the operating device, said pneumatic means including pneumatic pressure control means responsive to an applied control signal for varying the pressure differentially, and means for sensing tape movement past the operating device for applying a control signal to the pneumatic pressure control means which is representative of the difference between the actual speed of the web material and a desired speed of the web material at a given point.

5. A tape drive system for a tape transport having tape supply and take-up reels and an intermediate device operatively associated with the tape comprising pneumatic means for forming a pair of low inertia tape loops of variable length under pressure differentials, each loop being formed adjacent the intermediate device on opposite sides thereof, said pneumatic means including control means responsive to a control signal for differentially varying the pressure differentials, and tape speed sensing means for sensing the tape movement past the intermediate device for producing a control signal to operate the control means to adjust the actual tape velocity past the intermediate device.

6. The drive system of claim 5 further including tape loop position sensing means responsive to the loop lengths in the penumatic means, and means responsive to the tape lop sensing means for operating the tape supply and take-up reels to maintain the tape loops substantially at desired nominal lengths.

7. The drive system of claim 6 wherein said pneumatic means contains means for varying the tensions applied to the two loops in accordance with loop lengths, the tensions decreasing as loop length increases.

8. A tape drive system for a magnetic tape transport for moving the tape in a controlled fashion between supply and take-up reels past an intermediate recording and reproducing head assembly comprising first and second vacuum columns for forming low inertia tape loops adjacent opposite sides of the head assembly, vacuum control means responsive to control signals for differentially varying the vacuum levels within the first and second vacuum columns, and means responsive to the rate of tape movement past the head assembly for generating a control signal for operating the vacuum control means.

9. The tape drive system of claim 8 wherein said means for generating a control signal includes means for comparing the actual speed of tape movement with a desired speed of tape movement for generating a control signal indicative of the speed error.

10. The tape drive system of claim 9 wherein said vacuum control means also responds to externally generated command signals to establish a differential vacuum level between the two vacuum columns, and wherein the control signal produces variations in the established vacuum levels during tape movement to correct speed variations and overcome tape friction and inertia, and further including servo means responsive to the loop length within the vacuum columns for actuating the adjacent tape reel to maintain a predetermined loop length in each of the vacuum columns so that continuous tape movement is maintained in a selected direction in accordance with the command signal.

11. A tape drive system for a magnetic tape transport for moving the tape bidirectionally in a controlled fashion between supply and take-up reels past an intermediate recording and reproducing head assembly comprising first and second vacuum columns for forming low inertia tape loops adjacent opposite sides of the head assembly, vacuum control means for varying the vacuum levels within the first and second vacuum columns to change the pressure differentials across the tape loops in opposite directions in response to a control signal, control means for generating a control signal to operate the vacuum control means so that the tape is moved in a controlled fashion past the head assembly, and means associated with the first and second vacuum columns for varying the tape tensions introduced by the first and second vacuum columns in accordance with loop length.

12. The tape drive system of claim 11 wherein said first and second vacuum columns have fixed sidewalls substantially parallel to one another, and wherein said means for varying the tape tension includes a longitudinal groove formed midway between the sidewalls to intersect the tape loop, said groove defining an air passage bypassing the tape loop at the point of intersection therewith to reduce the pressure differential across the loop and said groove having a gradually increasing cross-sectional area towards the closed end of the column.

13. A tape drive system for a digital magnetic tape transport for accelerating the tape quickly for movement at a desired nominal speed between supply and take-up reels past an intermediate recording and reproducing head assembly comprising first and second vacuum columns for forming first and second low inertia tape loops adjacent opposite sides of the head assembly, first vacuum control means responsive to control signals for varying in opposite senses the vacuum levels within the first and second vacuum columns, third and fourth vacuum columns for forming third and fourth low inertia tape loops, each being intermediate a different one of the first and second vacuum columns and its associated tape reel, said first and second vacuum columns having a substantially smaller volume and tape storage capacity than the third and fourth vacuum columns, the first through fourth vacuum columns being symmertically disposed relative to the vacuum columns and forming a low friction low inertia tape path, first servo means including a pair of first loop position sensing means individually responsive to the loop lengths within the first and second vacuum columns and having additional vacuum control means coupled thereto for varying the vacuum pressures within the third and fourth vacuum columns to maintain the loops within the first and second vacuum columns at desired positions, and second servo means including a pair of second loop position sensing means responsive to the loop lengths within the third and fourth vacuum columns for operating the supply and take-up reels to maintain desired loop lengths within the third and fourth vacuum columns, said first and second loop positioning sensing means including longitudinal light source means and light sensitive means disposed on opposite walls of the columns, at least one of the light source and light sensitive means being graduated in length, whereby the tape is quickly accelerated to the desired speed by the small volume of the first and second vacuum columns whereas the third and fourth vacuum column provide the low inertia tape loop storage to prevent exceeding the low inertia tape storage capacity of the smaller colunms during acceleration and deceleration.

14. The tape drive system of claim 13 wherein the first and second vacuum columns contain mean for balacing the tape tensions applied to the first and second loops in accordance with the lengths thereof.

15. The tape drive system of claim 14 wherein said means for automatically balancing the tape tensions comprises a longitudinal groove disposed itermediate parallel sidewals of the column and defining a restricted air passage by-passing the tape loops at the point of intersection therewith, said groove having a gradually increasing cross-sectional area at the point of intersection with loops of increasing length.

16. A system for driving a tape gently but extremely rapidly in intermittent bidirectional operation, comprising a recording and reproducing head assembly, a first pair of differential pressure chambers disposed on opposite sides of the head assembly for forming loops of relatively short lengths in the tape, a second pair of differential pressure chambers disposed on opposed sides of the first pair of differential pressure chambers, means coupled to the first pair of differential pressure chambers for differentially varying the tape tensions exerted thereby, and means responsive to the loop lengths in the first pair of chambers and coupled to establish differential pressures in the second pair of chambers to maintain the loop lengths in the first pair of chambers substantially constant.

17. The invention as set forth in claim 16 above, wherein the first pair of chambers are substantially short relative to the second pair of chambers, and wherein the means for varying the tensions exerted by the first pair of chambers is additionally responsive to signals reproduced by the head assembly.

18. A tape drive system for correcting instantaneous tape speed variations produced by mechanical tape drive elements in frictional contact with the tape comprising first and second differential pressure columns for forming low inertia tape loops adjacent opposite sides of the head assembly, means for deriving a control signal indicative of the instantaneous speed variations in the tape movement past the head assembly, and means for differentially varying the pressure levels in the first and second differential pressure columns in response to the control signal to produce instantaneous loop length variations equal and opposite to the detected instantaneous tape speed variation.

19. The tape drive system of claim 18 wherein said means for varying the pressure include a loudspeaker device having a movable diaphragm defining the closed end of the column and actuating means responsive to the control signal for flexing the diaphragm to expand or contract the volume of the closed end of the column to momentarily change the pressure level.

20. A tape drive system for intermittently recording asynchronously received digital data on a magnetic tape comprising a magnetic head assembly for recording and reproducing data signals on the tape, a pair of pneumatic buffer means forming low inertia tape loops on opposite sides of the magnetic head assembly, means for momentarily creating a pressure differential between the two pneumatic buffer means to move the tape an incremental distance past the magnetic head assembly in response to a short duration command signal, and means responding to the command pulses for momentarily restraining further tape movement past the magnetic head assembly until the pressures within said pneumatic buffer means have been rebalanced.

21. A pneumatic drive system for moving a magnetic tape between tape storage reels in a manner for asynchronously recording digital data on a magnetic tape comprising a magnetic recording and reproducing head assembly, first and second vacuum chambers for forming low inertia tape loops adjacent opposite sides of the magnetic head assembly, each chamber having at least one side wall engaging a face of the tape in the shank portion of the corresponding tape loop, and each chamber containing loudspeaker means with a diaphragm substantially sealing the closed end of the chamber and being responsive to applied command signals for varying the vacuum pressures in the chambers, third and fourth vacuum chambers having substantially constant vacuum pressures therein, each being located between one of the smaller chambers and a respective one of the tape storage reels, and braking means responsive to the trailing edge of each command signal for applying a high friction force to the tape between said first and second tape loops to temporarily prevent further movement after an incremental movement.

22. The tape transport of claim 21 wherein said means for applying a friction force between the first and second tape loops consist of a signal responsive loudspeaker diaphragm attached to at least one of the first and second vacuum chambers on the outer surface of a perforated section of the side wall adjacent the magnetic head assembly.

References Cited

UNITED STATES PATENTS

| | | | |
|---|---|---|---|
| 3,148,816 | 9/1964 | Martin et al. | 242—55.12 X |
| 3,156,423 | 11/1964 | Potter et al. | 242—55.12 |
| 3,189,291 | 6/1965 | Welsh | 242—55.12 |
| 3,199,800 | 8/1965 | Reader | 242—55.12 |

LEONARD D. CHRISTIAN, *Primary Examiner.*

FRANK J. COHEN, *Examiner.*